(12) United States Patent
Ryon

(10) Patent No.: US 9,488,108 B2
(45) Date of Patent: Nov. 8, 2016

(54) RADIAL VANE INNER AIR SWIRLERS

(71) Applicant: Delavan Inc., Boston, MA (US)

(72) Inventor: Jason Ryon, Carlisle, IA (US)

(73) Assignee: Delavan Inc., West Des Moines, IA (US)

( * ) Notice: Subject to any disclaimer, the term of this patent is extended or adjusted under 35 U.S.C. 154(b) by 739 days.

(21) Appl. No.: 13/654,176

(22) Filed: Oct. 17, 2012

(65) Prior Publication Data

US 2014/0102572 A1   Apr. 17, 2014

(51) Int. Cl.
| | | |
|---|---|---|
| F23R 3/14 | (2006.01) | |
| F02C 7/236 | (2006.01) | |
| F23D 11/10 | (2006.01) | |
| F23R 3/28 | (2006.01) | |
| F15D 1/08 | (2006.01) | |

(52) U.S. Cl.
CPC ............... *F02C 7/2365* (2013.01); *F15D 1/08* (2013.01); *F23D 11/107* (2013.01); *F23R 3/14* (2013.01); *F23R 3/286* (2013.01); *Y10T 137/2087* (2015.04)

(58) Field of Classification Search
CPC .......... F15C 1/16; F23D 11/107; F23R 3/14; F23R 3/286; F23R 3/30; F23R 3/32
USPC ....... 239/463, 490, 403–406, 399, 469, 472; 137/808; 60/748; 431/182–184
See application file for complete search history.

(56) References Cited

U.S. PATENT DOCUMENTS

| | | | | |
|---|---|---|---|---|
| 3,733,169 A | * | 5/1973 | Lefebvre ...................... 431/265 |
| 3,851,466 A | * | 12/1974 | Verdouw ................ F23R 3/286 60/737 |
| 3,961,475 A | * | 6/1976 | Wood ......................... F23R 3/12 239/432 |
| 4,170,108 A | | 10/1979 | Mobsby | |
| 4,457,241 A | * | 7/1984 | Itse ............................ F23D 1/02 110/261 |
| 4,681,532 A | * | 7/1987 | Chung .................... F23C 7/008 110/264 |
| 5,529,000 A | * | 6/1996 | Hartel ...................... F23D 1/00 110/104 B |

(Continued)

FOREIGN PATENT DOCUMENTS

| | | |
|---|---|---|
| EP | 2213938 A2 | 8/2010 |
| EP | 2530382 A2 | 12/2012 |

OTHER PUBLICATIONS

United Kingdom Search Report issued in corresponding Application No. GB1317964.3, Apr. 30, 2014, 3 pages.

*Primary Examiner* — Arthur O Hall
*Assistant Examiner* — Alexander Valvis
(74) *Attorney, Agent, or Firm* — Locke Lord LLP; Scott D. Wofsy; Christopher J. Cillié

(57) ABSTRACT

A swirler includes a swirler body defining a diverging upstream surface defining a longitudinal axis and a plurality of swirl vanes extending from the diverging upstream surface. The swirl vanes are angled to impart swirl around the longitudinal axis on a fluid flow over the diverging upstream surface. An airblast injector includes a swirler as described above, and a nozzle body defining an air passage therethrough along the longitudinal axis with a diverging outlet. The swirler is operatively associated with a diverging outlet of the nozzle body. An annular swirler outlet area can be defined between downstream ends of the swirler and diverging outlet of the air passage. A throat area can be defined in the air passage upstream of the diverging outlet thereof. The swirler outlet area can be greater than the throat area.

10 Claims, 3 Drawing Sheets

(56) References Cited

U.S. PATENT DOCUMENTS

| | | | |
|---|---|---|---|
| 6,474,250 B1* | 11/2002 | Penterson | F23D 1/02 |
| | | | 110/261 |
| 7,926,282 B2 | 4/2011 | Chew et al. | |
| 7,926,744 B2 | 4/2011 | Thomson et al. | |
| 8,128,007 B2 | 3/2012 | Thomson et al. | |
| 8,146,837 B2 | 4/2012 | Thomson et al. | |
| 8,579,211 B2* | 11/2013 | Bathina et al. | 239/405 |
| 2003/0046936 A1* | 3/2003 | Oechsle | F23R 3/007 |
| | | | 60/748 |
| 2006/0021350 A1* | 2/2006 | Sanders | 60/743 |
| 2009/0224080 A1 | 9/2009 | Chew et al. | |
| 2009/0277176 A1 | 11/2009 | Caples | |
| 2009/0308957 A1 | 12/2009 | Hall | |
| 2010/0192580 A1* | 8/2010 | Simons et al. | 60/737 |
| 2010/0193602 A1* | 8/2010 | Ballu et al. | 239/224 |
| 2011/0089262 A1* | 4/2011 | Thomson et al. | 239/419 |

* cited by examiner

RADIAL VANE INNER AIR SWIRLERS

BACKGROUND OF THE INVENTION

1. Field of the Invention

The present invention relates to nozzles and injectors, and more particularly, to swirlers for nozzles and injectors in gas turbine engines.

2. Description of Related Art

In a fuel nozzle for a gas turbine engine, compressor discharge air is used to atomize liquid fuel. More particularly, the air provides a mechanism to breakup a fuel sheet into a finely dispersed spray that is introduced into the combustion chamber of an engine. Quite often the air is directed through a duct that serves to turn or impart swirl to the air. This swirling air flow acts to stabilize the combustion reaction.

There are many ways to develop swirl in a fuel nozzle. Historically, helically vaned swirlers 1, as shown in FIG. 1, were used because of their ability to effectively turn the air flow. These helical vanes 2 generated acceptable air flow characteristics for many engine applications. Helically vaned air swirlers are traditionally placed upstream 5 in the internal air path 4 of a nozzle 3. Fuel injected into the swirling flow is mixed with air for combustion downstream 6.

Such conventional methods and systems have generally been considered satisfactory for their intended purpose. However, there is still a need in the art for a swirler that allows for improved control of wake and air sheath thickness, a larger mass flow rate while maintaining desired swirl, reduced weight and reduced pollutant emissions, including $NO_R$. There also remains a need in the art for such a swirler that is easy to make and use. The present invention provides a solution for these problems.

SUMMARY OF THE INVENTION

The subject invention is directed to a new and useful swirler for inducing swirl on a fluid flow. The swirler includes a swirler body defining a diverging upstream surface and a longitudinal axis and a plurality of swirl vanes extending from the diverging upstream surface. The swirl vanes are angled to impart swirl around the longitudinal axis on a fluid flow over the diverging upstream surface.

In accordance with certain embodiments, the swirl vanes can each extend upstream from the diverging upstream surface. The swirl vanes can each extend radially outward relative to the longitudinal axis. The swirl vanes can each extend both upstream from the upstream diverging surface and radially outward relative to the longitudinal axis. In addition, the swirl vanes can each define an upstream swirl vane end surface configured and adapted to be operatively associated with a downstream diverging surface radially outboard of the diverging upstream surface to form a diverging conical flow passage through the swirl vanes. The swirler can also include a cooling air circuit mounted to the upstream diverging surface in fluid communication with an aperture through the swirler body for providing a cooling flow to a downstream surface of the swirler body.

The invention also provides an airblast injector for atomizing a liquid. The airblast injector includes a swirler as described above, and a nozzle body defining an air passage therethrough along the longitudinal axis with a diverging outlet. The swirler is operatively associated with the diverging outlet of the nozzle body. The nozzle body includes a liquid circuit having an outlet outboard of and proximate to the diverging outlet of the air passage for airblast atomization of liquid sprayed from the outlet of the liquid circuit assisted by swirling air from the swirler.

In accordance with certain embodiments, an annular swirler outlet area can be defined between downstream ends of the swirler and diverging outlet of the air passage. A throat area can be defined in the air passage upstream of the diverging outlet thereof. The swirler outlet area can be greater than the throat area, by more than about 30%, for example. The swirl vanes can each define an upstream swirl vane end surface operatively associated with the diverging outlet radially outboard of the diverging upstream surface to form a conical flow passage through the swirl vanes that diverges away from the longitudinal axis. A clearance can be defined between the upstream diverging surface of the swirler and the diverging outlet of the nozzle body, wherein the clearance diminishes in the downstream direction relative to the longitudinal axis. The swirler body can extend further downstream along the longitudinal axis than the diverging outlet of the air passage of the nozzle body.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 2:
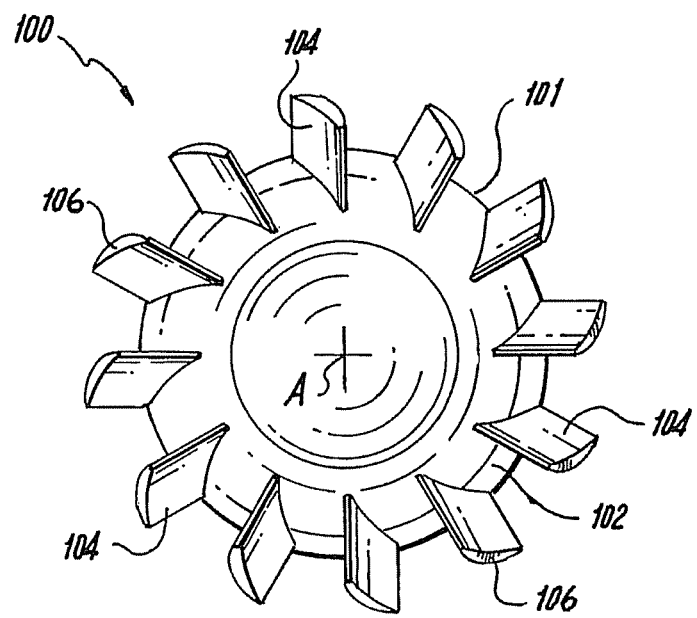
FIG. 2 is an upstream end view of an exemplary embodiment of a radial vane inner air swirler constructed in accordance with the present invention, showing the swirler body with vanes radiating therefrom.

Reference will now be made to the drawings wherein like reference numerals identify similar structural features or aspects of the subject invention. For purposes of explanation and illustration, and not limitation, a partial view of an exemplary embodiment of the radial vane inner air swirler in accordance with the invention is shown in FIG. 2 and is designated generally by reference character 100. Other embodiments of the radial vane inner air swirler in accordance with the invention, or aspects thereof, are provided in FIGS. 3-5, as will be described.

With reference to FIG. 2, the subject invention is directed to a new and useful swirler 100 for inducing swirl on a fluid flow. Swirler 100 includes a swirler body 101 defining a diverging upstream surface 102 and a longitudinal axis A and a plurality of swirl vanes 104 extending from diverging upstream surface 102. Swirl vanes 104 are angled to impart swirl around longitudinal axis A on a fluid flow over diverging upstream surface 102.

Figure 3:
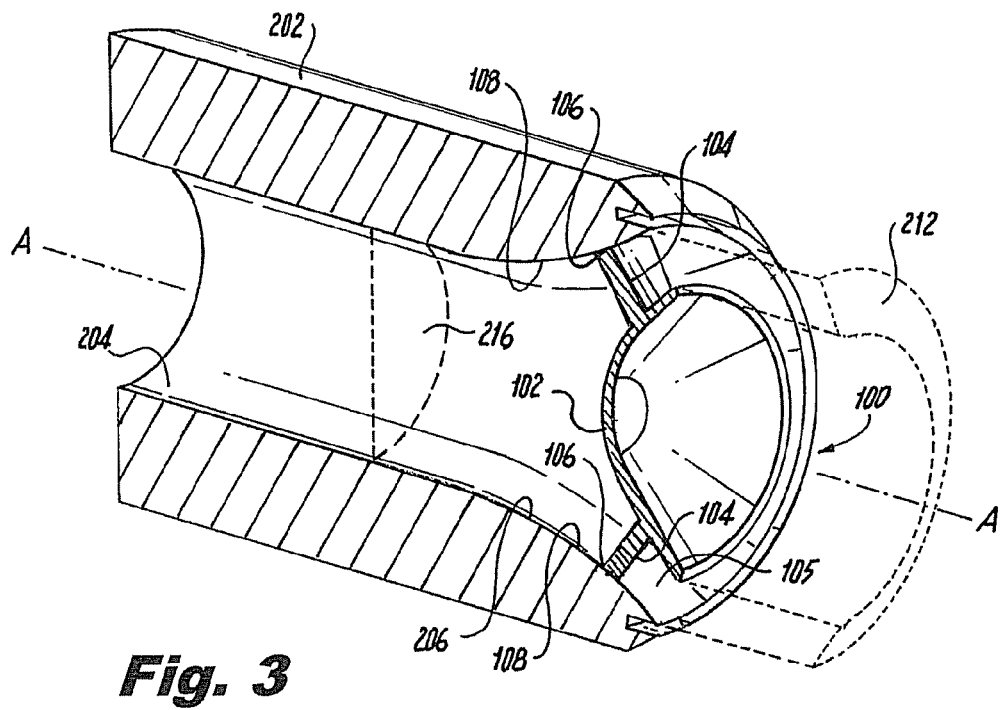
FIG. 3 is a perspective cross-sectional view of the radial vane inner air swirler of FIG. 2, shown operatively associated with a downstream diverging surface of an injection nozzle.

Referring to FIGS. 2 and 3, swirl vanes 104 each extend upstream from diverging upstream surface 102. Swirl vanes 104 each also extend radially outward relative to longitudinal axis A. Swirl vanes 104 each define an upstream swirl vane end surface 106 configured and adapted to be operatively associated with a downstream diverging surface 108, e.g. diverging outlet 206, shown in FIG. 3, radially outboard of diverging upstream surface 102 to form a diverging conical flow passage 105 through swirl vanes 104.

Figure 4:
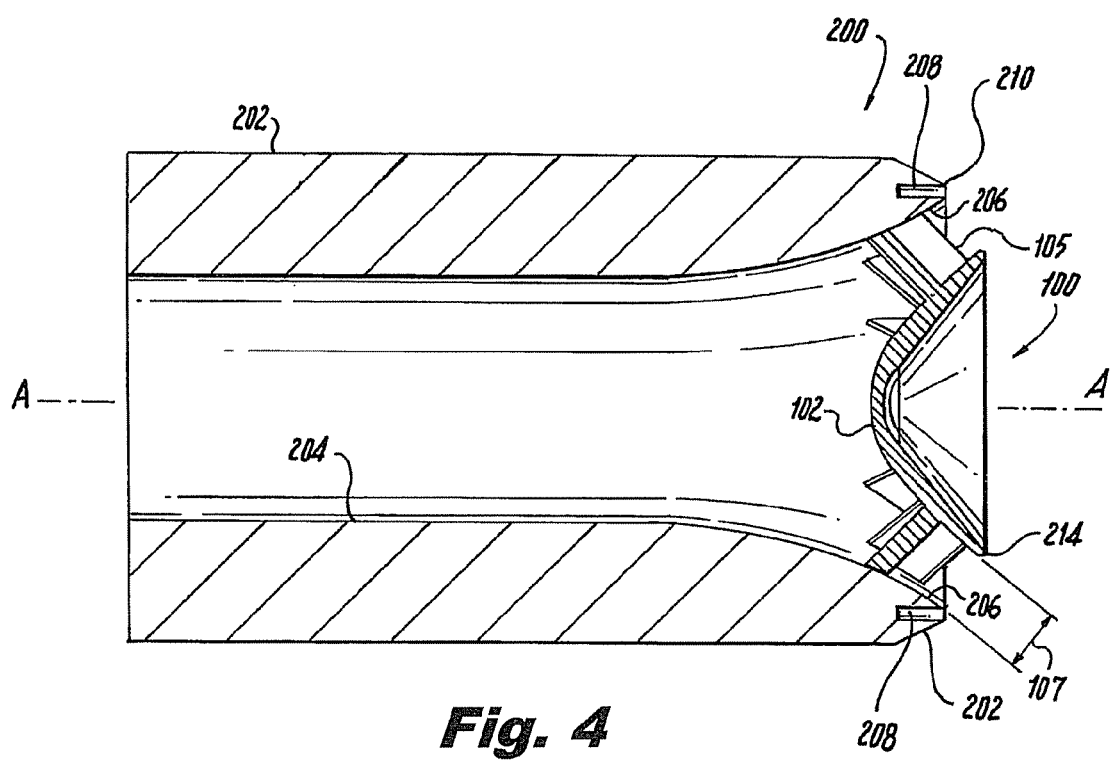
FIG. 4 is a cross-sectional side elevation view of the injector of FIG. 3, showing the clearance between the upstream diverging surface of the swirler and the diverging outlet of the nozzle body that diminishes in the downstream direction.

With reference now to FIG. 4, the invention also provides for an airblast injector 200 for atomizing a liquid. Airblast injector 200 includes a swirler 100 as described above, and a nozzle body 202 defining an air passage 204 therethrough along longitudinal axis A with a diverging outlet 206. Swirler 100 is operatively associated with diverging outlet 206 of nozzle body 202 by affixing vane end surfaces 106 to the surface of diverging outlet 206 by any suitable means such as brazing or welding. Those having skill in the art will appreciate that swirler 100 does not need to be solidly mounted to diverging outlet 206 of nozzle body 202 at vanes 104. While described above in the exemplary context of swirler 100 being affixed by vane end surfaces 106 to the surface of diverging outlet 206, those skilled in the art will readily appreciate that various alternatives are available, for example, vane end surfaces 106 can be in unconstrained contact with the surface of diverging outlet 206 but not be mounted, or a small gap could be left between vanes 104 and diverging outlet 206 and swirler 100 would be mounted to the rest of the assembly in another way, such as standoffs upstream of vanes 104.

With continued reference to FIG. 4, a clearance 107, is defined between upstream diverging surface 102 of swirler 100 and the diverging outlet 206 of nozzle body 202, wherein clearance 107 diminishes in the downstream direction, while conical flow passage 105 is diverging away from longitudinal axis A. While shown and described herein in the exemplary context of clearance 107 diminishing, i.e. decreasing, those skilled in the art will readily appreciate that clearance 107 can be increasing, constant or even a combination, i.e. decreasing and then increasing. Those having skill in the art will readily appreciate that upstream diverging surface 102 and diverging outlet 206 do not need to be strictly conical, so clearance 107 can diminish and then start to increase again through the rest of conical flow passage 105 depending on the shape of diverging surface 102 and diverging outlet 206.

In further reference to FIG. 4, swirler body 101 extends further downstream along longitudinal axis A than diverging outlet 206 of air passage 204 of nozzle body 202. Nozzle body 202 includes a liquid circuit 208 having an outlet 210 outboard of and proximate to diverging outlet 206 of air passage 204 for airblast atomization of liquid sprayed from outlet 210 of liquid circuit 208 assisted by swirling air from swirler 100. Fuel circuitry internal to nozzle body 202 is not depicted, but any fuel circuit configuration for delivering fuel from an external source to outlet 210 can be used. Those having skill in the art will appreciate that swirler 100 can be designed to control the air sheath exiting from diverging outlet 206 of air passage 204. The air sheath can be thicker or thinner than a traditional helical air swirler while maintaining the same Air Effective Area ($AC_D$). In addition, those having skill in the art will appreciate that swirler 100 can also be configured to maintain a thinner sheath much farther into downstream air passage 204 after diverging outlet 206 than a traditional helical swirler.

Figure 1:
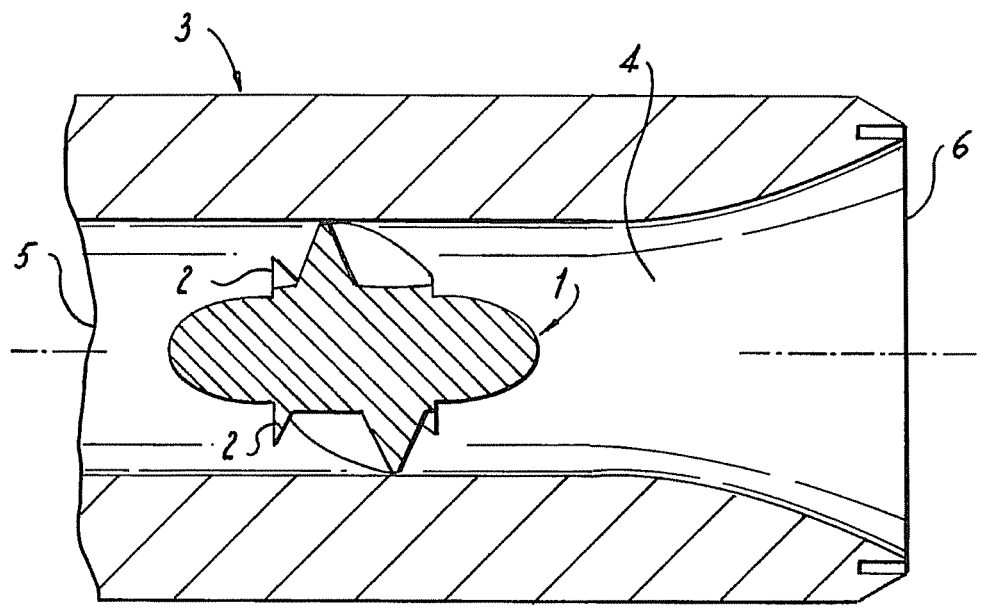
FIG. 1 is a cross-sectional side elevation view of a prior art helical air swirler, showing the swirler operatively associated with a fuel nozzle.

An annular swirler cross-sectional outlet area 212, indicated by broken lines in FIG. 3, is defined between downstream end 214 of swirler 100 and diverging outlet 206 of air passage 204. A throat cross-sectional area 216, indicated by broken lines in FIG. 3, is defined in air passage 204 upstream of diverging outlet 206 thereof. Swirler outlet area 212 is greater than throat area 216, i.e. air passage 204 is diverging. Swirler outlet area 212 can be greater than throat area 216 by more than about 30%, or by any other suitable proportion for a given application. Those having skill in the art will appreciate that swirler outlet area 212 may also be less, i.e. air passage 204 is converging, or equal to throat area 216 depending on the needs for a given application. Those having skill in the art will also appreciate that vanes 104 actually block some of the area through conical flow passage 105 of air passage 204, so the cross-sectional area can be converging up to a point in vanes 104, then diverging once it is downstream of vanes 104. Those having skill in the art will also appreciate that throat area 216 has a limited diameter and that the geometric area of air passage 204 increases near swirler outlet 212 (i.e. it is a diverging outlet). Those having skill in the art will appreciate that even if clearance 107 is radially diminishing, air passage 204 can still be diverging because swirler outlet area 212 can be greater than throat area 216 due to the increase in circumference. This permits a larger mass flow rate of air, therein increasing the $AC_D$, while still maintaining the desired swirl. In addition, those skilled in the art will appreciate that the increased $AC_D$ permits a smaller throat area 216 diameter and a lighter overall fuel nozzle compared to the traditional configurations shown in FIG. 1, for example. A smaller throat area is also advantageous in applications where there is limited room, for example, when there is heat shielding, pilot circuits, etc.

Those having skill in the art will also appreciate that as the air is swirled by swirl vanes 104, the inner diameter can be controlled such that the geometric area is converging either through swirl vanes 104 or downstream of swirl vanes 104 to minimize the wakes from swirl vanes 104. This flexibility to control wake sizes is important for the design of a fuel nozzle which re-circulates hot gas products back into the fuel stream.

Figure 5:
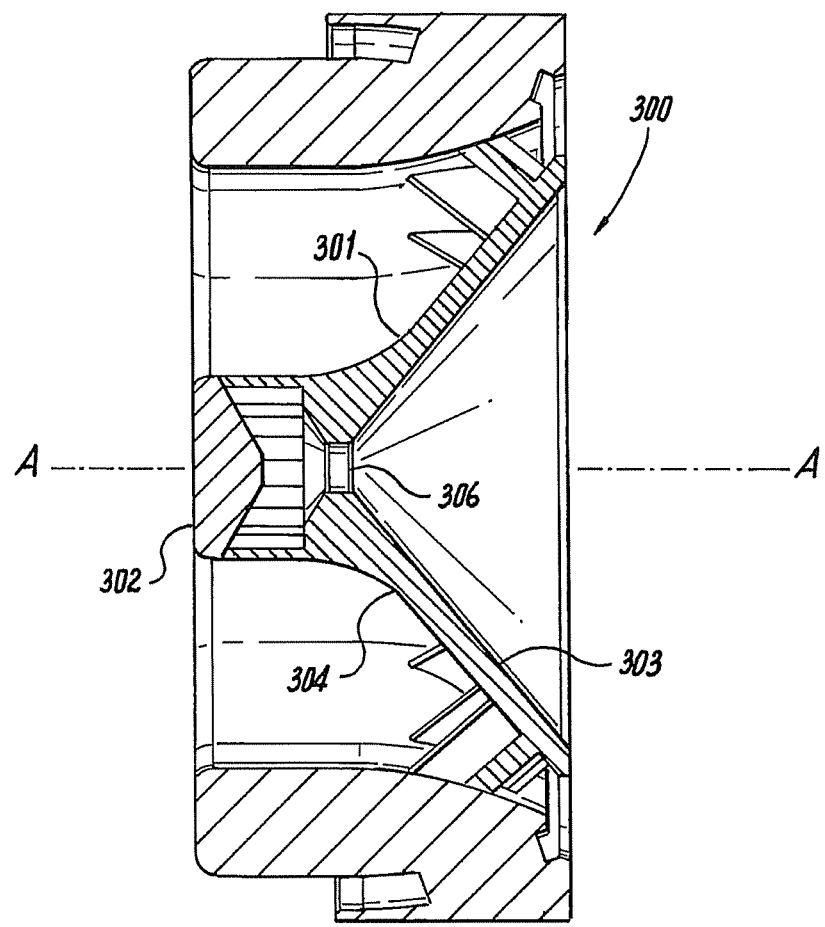
FIG. 5 is a cross-sectional side elevation view of another exemplary embodiment of a radial vane inner air swirler constructed in accordance with the present invention, showing a cooling air circuit mounted on the swirler.

With reference now to FIG. 5, another exemplary embodiment of a swirler 300 in accordance with the invention includes a cooling air circuit 302 mounted to the upstream diverging surface 304 in fluid communication with an aperture 306 through swirler body 301 for providing a cooling flow to a downstream surface 303 of swirler body 301. Those skilled in the art will readily appreciate that cooling air circuit 302 is configured to prevent damage to downstream surface 303 of swirler body 301 exposed typically in close proximity to combustion products. Those skilled in the art will readily appreciate that because embodiments constructed in accordance with the present invention, i.e. swirlers 100 and 300, may be further positioned into the combustion reaction zone than a traditional helical swirler, thermal management can be key in certain applications. While described above in the exemplary context of using cooling air circuit 302 for thermal management, those skilled in the art will readily appreciate that various countermeasures to the high thermal stresses experienced by swirlers, e.g. swirler 100 or 300, are available, for example, cooling holes to prevent damage to the exposed downstream portion, e.g. downstream portion 303, heat tolerant materials, such as high temperature metals or ceramics, internal liquid cooling, additional air circuits or backside liquid impingement cooling.

Advantages provided by embodiments of the present invention include reduced air sheath thickness and a more concentrated axial velocity near the liquid outlet, i.e. liquid outlet 210. These factors result in a smaller reaction zone which leads to lower predicted $NO_x$ emissions than those of traditional helically vaned swirlers. Another factor in reducing $NO_x$ emissions is air sheath thickness. Due to the increased wake thickness control, if desired, the wake thickness can be decreased. A reduced wake thickness creates a thinner air sheath and in turn reduces $NO_x$ emissions. In addition, embodiments of the present invention allow for reduced weight as compared to traditional helically vaned swirlers.

While shown and described herein in the exemplary context of swirling air, those skilled in the art will readily appreciate that swirlers as described herein can be used to swirl liquids. Moreover, while shown and described herein in the exemplary context of gas turbine engines, those skilled in the art will readily appreciate that nozzles, injectors and swirlers as described herein can be used in any suitable application without departing from the spirit and scope of the invention.

The methods and systems of the present invention, as described above and shown in the drawings, provide for radial vane inner air swirlers with superior properties including a larger mass flow rate while still maintaining the desired swirl, allow for a lighter and smaller configuration, increased control over wake and sheath thickenss, and reduced $NO_x$ emissions. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. An airblast injector for atomizing a liquid, comprising:
a swirler with a longitudinal axis; and
a nozzle body defining an air passage therethrough along the longitudinal axis with a diverging outlet, wherein the swirler is operatively associated with the diverging outlet of the nozzle body,
wherein the nozzle body includes a liquid circuit having an outlet radially outward of and axially overlapping the diverging outlet of the air passage for airblast atomization of liquid sprayed from the outlet of the liquid circuit assisted by swirling air from the swirler,
wherein the swirler further comprises:
a swirler body defining a diverging upstream surface and the longitudinal axis, the diverging surface extending between an upstream tip and a downstream end of the swirler body; and
a plurality of swirl vanes extending from the diverging upstream surface,
wherein the swirl vanes are angled to impart swirl around the longitudinal axis on air flowing over the diverging upstream surface,
wherein the diverging upstream surface of the swirler body and the diverging outlet of the air passage define a conical flow passage, and
wherein the plurality of swirl vanes are substantially disposed within the conical flow passage between the diverging surface of the swirler body and the diverging outlet of the nozzle body,
wherein swirl vane end surfaces of the plurality of swirl vanes are affixed to a surface of the diverging outlet defined by the nozzle body.

2. An injector as recited in claim 1, wherein an annular swirler outlet area is defined between the downstream end of the swirler and the diverging outlet of the air passage, wherein a throat area is defined in the air passage upstream of the diverging outlet thereof, and wherein the swirler outlet area is greater than the throat area.

3. An injector as recited in claim 2, wherein the swirler outlet area is greater than the throat area by more than 30%.

4. An injector as recited in claim 1, wherein the swirl vane end surfaces are operatively associated with the diverging outlet radially outboard of the diverging upstream surface to form the conical flow passage through the swirl vanes that diverges away from the longitudinal axis.

5. An injector as recited in claim 4, wherein a clearance is defined between the upstream diverging surface of the swirler and the diverging outlet of the nozzle body, wherein the clearance diminishes in the downstream direction relative to the longitudinal axis downstream of the plurality of vanes.

6. An injector as recited in claim 1, wherein the swirler body extends further downstream along the longitudinal axis than the diverging outlet of the air passage of the nozzle body.

7. An injector as recited in claim 1, wherein the diverging upstream surface of the swirler body intersects the longitudinal axis.

8. An injector as recited in claim 1, wherein at least one of the plurality of swirler vanes extend longitudinally between a leading edge and a trailing edge, both the leading edge and the trailing edge being disposed in the diverging outlet of the nozzle body air passage.

9. An airblast injector for atomizing a liquid, comprising:
a swirler with a longitudinal axis; and
a nozzle body defining an air passage therethrough along the longitudinal axis with a diverging outlet, wherein the swirler is operatively associated with the diverging outlet of the nozzle body,
wherein the nozzle body includes a liquid circuit having an outlet outboard of and directly adjacent to the diverging outlet of the air passage for airblast atomization of liquid sprayed from the outlet of the liquid circuit assisted by swirling air from the swirler,
wherein the swirler further comprises:
a swirler body defining a diverging upstream surface and the longitudinal axis, the diverging surface defining an arcuate profile extending between an upstream tip and a downstream end of the swirler body; and
a plurality of swirl vanes having leading edges extending from the diverging upstream surface,
wherein the swirl vanes are angled to impart swirl around the longitudinal axis on air flowing over the diverging upstream surface,
wherein swirl vane end surfaces of the plurality of swirl vanes are affixed to a surface of the diverging outlet defined by the nozzle body
wherein the swirl vanes overlap the outlet of the liquid circuit along the longitudinal axis of the nozzle body;

wherein the swirler body extends further in a downstream direction along the longitudinal axis than the diverging outlet of the air passage of the nozzle body.

10. An airblast injector for atomizing a liquid, comprising:
a swirler with a longitudinal axis; and
a nozzle body defining an air passage therethrough along the longitudinal axis with a diverging outlet, wherein the swirler is operatively associated with the diverging outlet of the nozzle body,
wherein the nozzle body includes a liquid circuit having an outlet radially outward and directly adjacent to the diverging outlet of the air passage for airblast atomization of liquid sprayed from the outlet of the liquid circuit assisted by swirling air from the swirler,
wherein the swirler further comprises:
  a swirler body defining a diverging upstream surface and the longitudinal axis, the diverging surface extending between an upstream tip and a downstream end of the swirler body; and
  a plurality of swirl vanes having leading edges extending from the diverging upstream surface,
  wherein the swirl vanes are angled to impart swirl around the longitudinal axis on air flowing over the diverging upstream surface;
wherein the diverging upstream surface of the swirler body and the diverging outlet of the air passage define a conical flow passage,
wherein swirl vane end surfaces of the plurality of swirl vanes are affixed to a surface of the diverging outlet defined by the nozzle body, and
wherein each of the plurality of swirl vanes are completely disposed within the conical flow passage,
wherein each of the plurality of swirl vanes are completely disposed between the diverging upstream surface of the swirler body and the diverging outlet of the air passage.

* * * * *